(12) United States Patent
Von Sydow

(10) Patent No.: US 8,463,734 B2
(45) Date of Patent: Jun. 11, 2013

(54) SYSTEM IMPLEMENTED BY A PROCESSOR CONTROLLED MACHINE FOR INDUCTIVE DETERMINATION OF PATTERN PROBABILITIES OF LOGICAL CONNECTORS

(76) Inventor: Momme Von Sydow, Goettingen (DE)

( * ) Notice: Subject to any disclaimer, the term of this patent is extended or adjusted under 35 U.S.C. 154(b) by 574 days.

(21) Appl. No.: 12/669,532

(22) PCT Filed: Jul. 17, 2008

(86) PCT No.: PCT/EP2008/005861
§ 371 (c)(1),
(2), (4) Date: Jun. 10, 2010

(87) PCT Pub. No.: WO2009/010293
PCT Pub. Date: Jan. 22, 2009

(65) Prior Publication Data
US 2010/0293134 A1    Nov. 18, 2010

Related U.S. Application Data

(60) Provisional application No. 60/950,214, filed on Jul. 17, 2007.

(51) Int. Cl.
*G06N 7/00*    (2006.01)

(52) U.S. Cl.
USPC .......................................................... 706/55

(58) Field of Classification Search
USPC .......................................................... 706/55
See application file for complete search history.

(56) References Cited

PUBLICATIONS

"Probabilistic logic programming and Bayesian networks", Liem Ngo, Peter Haddawy, Algorithms, Concurrency, and Knowledge, LNCS, 1995 vol. 1023/1995, pp. 286-300.*

* cited by examiner

*Primary Examiner* — Kakali Chaki
*Assistant Examiner* — Mai T Tran
(74) *Attorney, Agent, or Firm* — Whitham Curtis Christofferson & Cook, PC

(57) ABSTRACT

The invention relates to a system for the inductive determination of pattern probabilities of 16 dyadic logical connectors. Said system is especially useful for technically predicting human behavior, e.g. inclusion fallacies, and is therefore useful for controlling of technical systems and for data mining, search engines or human-machine interfaces. The system can be implemented in software with a processor controlled machine.

11 Claims, 3 Drawing Sheets

Fig: 1

SYSTEM IMPLEMENTED BY A PROCESSOR CONTROLLED MACHINE FOR INDUCTIVE DETERMINATION OF PATTERN PROBABILITIES OF LOGICAL CONNECTORS

CROSS-REFERENCE TO RELATED APPLICATIONS

This application claims benefit of U.S. provisional patent application 60/950,214, filed Jul. 17, 2007, the complete contents of which is hereby incorporated by reference.

FIELD OF INVENTION

The invention relates to a system for the inductive determination of pattern probabilities of 16 dyadic logical connectors. Said system is especially useful for technically predicting human behavior, e.g. inclusion fallacies, and is therefore useful for controlling of technical systems and for data mining, search engines or human-machine interfaces.

The invention further relates to a respective method for inductive determination of pattern probabilities of all 16 dyadic logical connectors.

BACKGROUND

Many technical systems like machines, search engines for databases and internet, e-commerce applications etc. require complex decisions and search or control strategies. A plurality of input data is to be evaluated in order to determine a specific probability of a situation.

The use of probability based systems for this aim is well known.

A standard probability logic makes directly use of the classical axioms of probability theory described by A. Kolmogorov: Grundbegriffe der Wahrscheinlichkeitsrechnung. Berlin: Springer-Verlag, 1933. The first two axioms state that probabilities are positive (non-negativity) and that a true proposition has the probability of one (normalization). The conjunction rules can be derived directly from the third axiom of (finite) additivity (sometimes δ-additivity). The probability of an even set, which is the union of an other disjoined subset of events is the sum of the probabilities of those subsets.

There are alternative calculi of probability of believe which have abandoned or extended the axioms of probability theory. However, even, for instance, Baconian probabilities, belief Functions, and the t-norms of fuzzy logic adhere to the conjunction rule stating that the probability of a first event set can never become larger than the probability of a second event set being part of the first event set, i.e. the second event set includes the intention (sense) and the extension (actual elements of a set) of the first event set.

WO 2007/084669 A2 discloses a system and method for electing subjective probabilities making use of Bayesian probabilistic networks among others. The system and method is used for dynamically interacting with a human expert by means of a graphical user interface to elicit subjective probabilities that can subsequently be utilized in a probabilistic network. A Bayesian network in designed to predict one or more outcomes based on a variety of causal relationships. A probability table is associated with each variable of the Bayesian network and information such as subjective probabilities. The Bayesian network is elicited.

U.S. Pat. No. 7,328,201 B2 discloses a system and method of using synthetic variables to generate relational Bayesian network models of internet user behaviors. Relational Bayesian modelling combines a relational data model with the probabilistic semantics needed to effectively model the stochastic elements of the observable behavior.

U.S. Pat. No. 5,704,017 discloses a system for collaborative filtering by use of a Bayesian network. The Bayesian network has learned using prior knowledge and a database containing empirical data obtained from many people containing attributes of users as well as their preferences in the field of decision making. The network accuracy is improved by re-learning at various intervals.

WO 2007/038713 A2 discloses a search engine determining results based on probabilistic scoring of relevance. An overall semantic relevance value for the occurrence of a term is determined by statistically combining an assignor relevance score determined for a plurality of assignors. The assignor relevance scores for the occurrence of the terms are determined by statistically combining an accuracy value and a consistency value.

The Bayesian logic is useful for automated filtering of data and for decision making. The object of the present invention is to provide an improved system and method for the inductive (data-based) determination of a specific kind of pattern probabilities of all 16 dyadic logical connectors suited for technically predicting human behavior, e.g. inclusion fallacies.

SUMMARY

The object is achieved by the aforementioned system comprising
- at least one input unit for frequency data, prior probabilities of connectors and noise levels, and model parameters;
- a central representation unit out of a field of specific ideal probability tables based on the specific model assumptions;
- a first determination unit for (preferably simultaneously) calculating the data probability given this field of probability tables via multinomial distributions for each table;
- a second determination unit for a Bayesian updating process for each probability table; and
- an output unit for providing pattern-sensitive hypothesis probabilities for connectors at a particular noise level and aggregated probabilities for noise levels or connectors.

According to the present invention, the determination of logical pattern probabilities is directed to estimate the probability of dyadic logical connectors in the sense of an inductive non-standard propositional logic. The logical connectors are not, according to the prior art, understood as deterministic logical connectors. They are neither understood as the extensional probabilities (the limit of a frequency of elements in a logical set, relative to all elements in a universe of discourse). In contrast, the invention is concerned with an inductive probabilistic logic representing each connector by different noise levels and different probability tables which again have probabilities.

The system is pattern-sensitive wherein data having the same extensional probability will get different hypothesis probabilities due to different patterns either within the true cases or the false cases.

Moreover, in contrast to prior art the rank order of the hypothesis probabilities of different logical connectors can change only based on changes in the sample size, keeping all extensional probabilities of a contingency table identical.

In contrast to classical and non-classical probability theories of the prior art, the inclusion rule does not apply for the system according to the present invention.

Further, in contrast to the prior art, the pattern probabilities of the logical connectors is determined by use of whole fields of probability tables, particular noise levels and the aggregated probabilities for weighted noise levels, wherein the resulting probabilities for the noise levels is calculated simultaneously from the input data.

In a preferred embodiment, the central representation unit is provided for representing a field comprising logical connectors and related noise levels of specific ideal probability tables.

Thus, for each possible dyadic logical connector, related noise levels are stored in probability tables such, that each probability table has a noise level.

It is a preferred embodiment that the first determination unit is provided to determine separately the likelihood of the frequency data entered into the input unit for each connector together with one given noise level.

Further, it is preferred when the system comprises a weighting unit provided to weight the noise probabilities of each connector in a way which monotonically decreases with the inverse of their probability. The weighted noise level probabilities might be normalized to get a probability mass function again.

Further, it is most preferred when the second determination unit is provided to update the probability for noise levels and connector patterns separately for each combination of connector and noise level.

The system is preferably embedded into a technical implementation for data mining, search engines, human-machine interfaces or any implementation requiring technically predicting human behavior.

Further, it is preferred that alternatively the output unit updates the probability for noise levels and connector patterns by making use of the aggregated probabilities for each noise level and each connector and by recombining both.

Further, it is preferred that the system may also provide most probable and ranking outputs both for connectors, noise levels, and noise-level-connector combinations.

The system can be implemented in software with a processor controlled machine wherein the probability tables are stored in a storage medium, and wherein the processor controlled machine has access to this storage medium.

The object is further achieved by the method for inductive determination of pattern probabilities of all 16 dyadic logical connectors comprising the steps of:
   a) inputting frequency data, prior probabilities of connectors and noise levels, and model parameters;
   b) representing a field of specific ideal probability tables based on specific model assumptions;
   c) simultaneously calculating the data probability given said ideal probability tables via multinomial distributions;
   d) updating of each of the probability tables by use of a Bayesian logic;
   e) outputting pattern-sensitive hypothesis probabilities for connectors at a particular noise level and aggregated probabilities for noise levels or connectors.

Preferred embodiments are disclosed in the dependent claims.

DESCRIPTION OF THE DRAWINGS

The invention is disclosed in the following by use of exemplary embodiments with the enclosed drawings. It shows.

DETAILED DESCRIPTION

Figure 1:
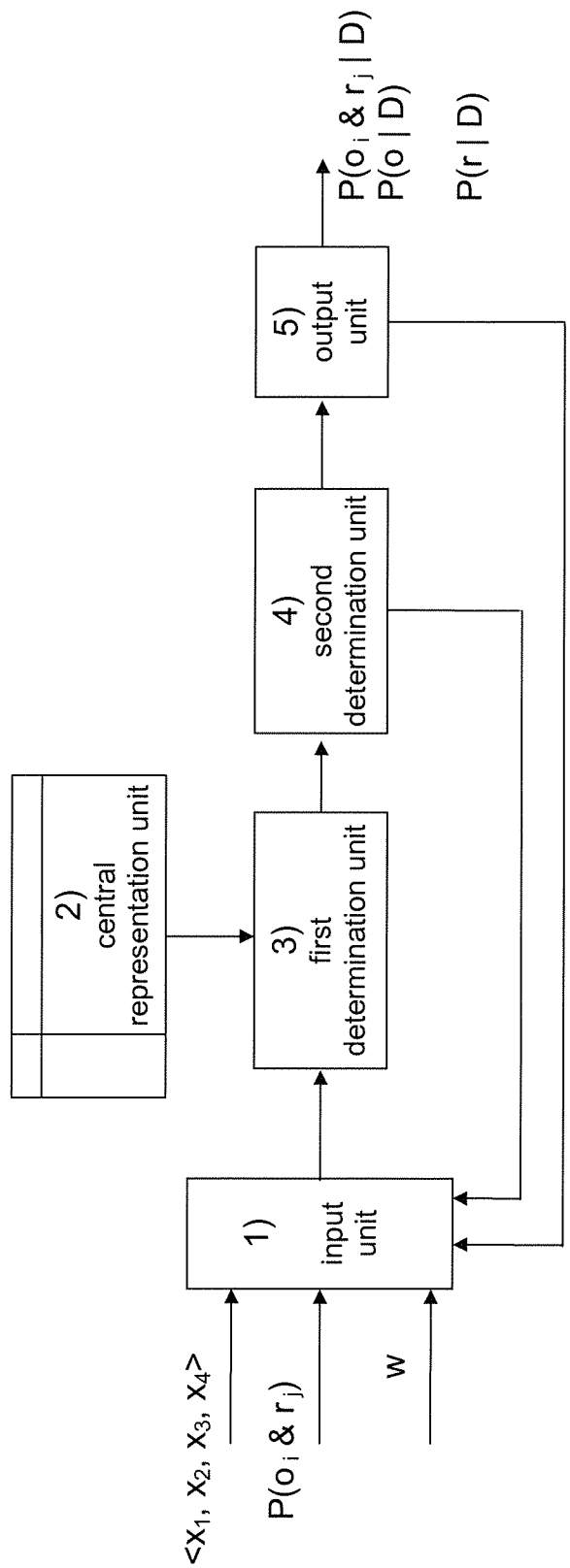
FIG. 1: Block diagram of a system for inductive determination of pattern probabilities.

FIG. 1 shows a block diagram of a system for inductive determination of pattern probabilities of all 16 dyadic logical connectors.

The system comprises an input unit 1 for inputting frequency data, prior probabilities and weighting parameters. The frequency data may be empirical data or generated data stored in a 2×2 contingency table. The prior probabilities of connectors and nose levels are the probabilities obtained in the prior step for each idealized probability table, i.e. for each connector combined with a particular noise level. Alternatively, there is an interface for a direct input of this field of priors. As default flat priors are used.

Additional model parameters which can be optionally set in or given to the basic model are converging probabilities, noise level resolutions, sampling parameters (for data obtained from samples that are known to be biased), etc.

A basic model is provided in a central representation unit 2 comprising storage means for storing and representing a field of ideal probability tables. For each of the 16 dyadic logical connectors a number of n idealized probability tables is provided, each considering a particular noise level and each composed out of an of a quadruple of four probabilities.

A first determination unit 3 is connected to the input unit 1 and the central representation unit 2 comprising data processing means for simultaneously calculating each data probability given a postulated probability table via a multinomial distribution, wherein each probability table is hypothetically representing an ideal connector at a particular noise level.

A second determination unit 4 is connected to the input unit 1 and the first determination unit 3 comprising processing means provided for a Bayesian updating process for each probability table. It also directly feeds back to the prior probabilities of the noise-connector combinations in unit 1.

The result provided by the second determination unit 4 is forwarded to an integration and output unit 5 calculating aggregated probabilities for connectors, or connectors and giving back simple pattern-sensitive hypotheses probabilities for connectors at a particular noise level and aggregated probabilities for noise levels, or connectors.

The resulting aggregated probabilities can be recombined to produce probabilities of connector-noise-level combinations and then feed back to the input unit 1 in form of prior probabilities.

Figure 2:
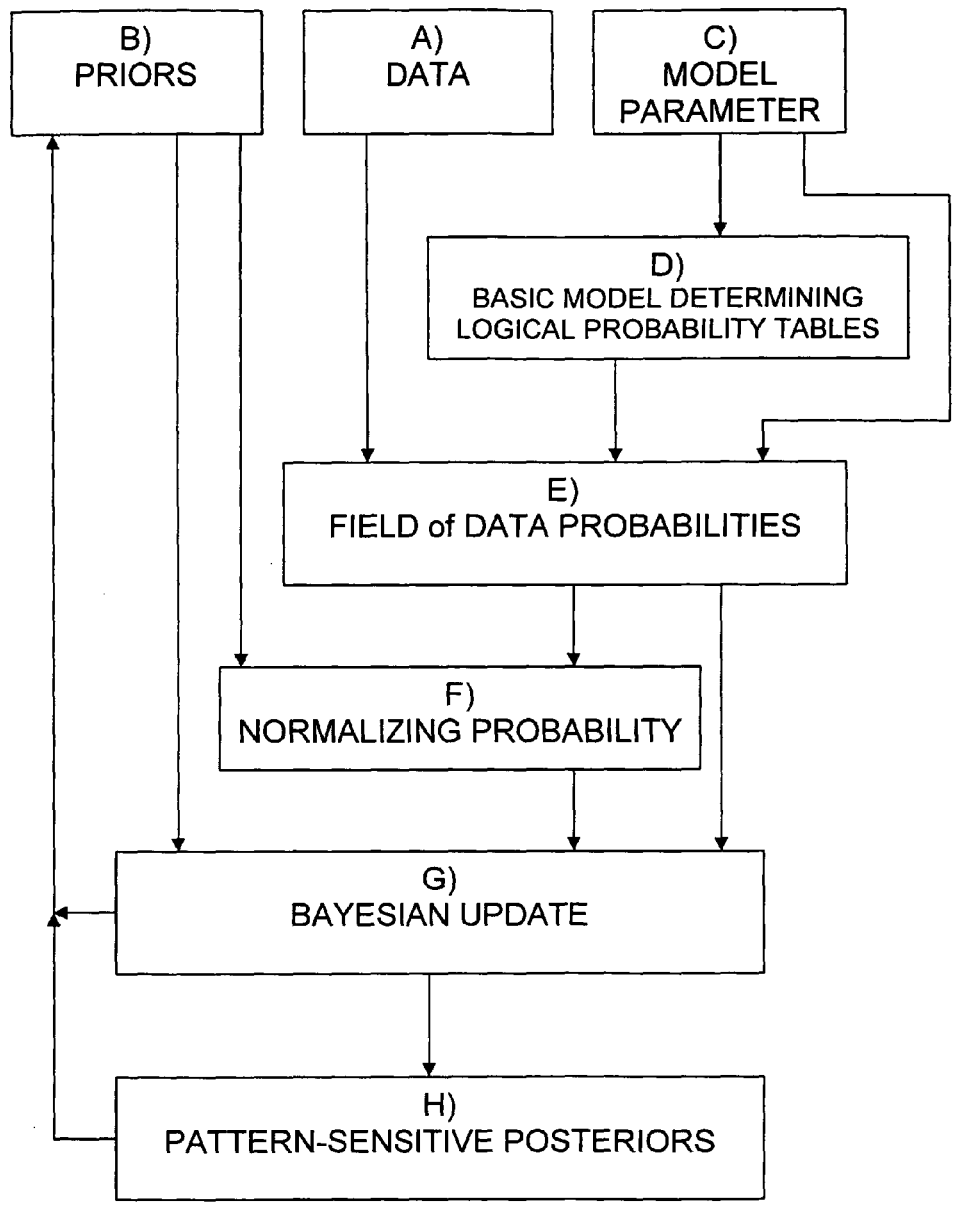
FIG. 2: Flowchart of the method for inductive determination of pattern probabilities.

FIG. 2 is a flow diagram of the method for the inductive determination of pattern probabilities of all 16 dyadic logical connectors. The method is in contrast e.g. to standard Kolmogorov subset probabilities and can be used e.g. for technically predicting human behavior.

In a step A) "DATA" a 2×2 contingency table is provided as input table. The data are e.g. empirically or generated frequency data. The contingency table provides a frequency of combinations of propositions A logical connected to proposition B, wherein N is the sum of all frequencies data x.

A 2×2 contingency table may have the following scheme:

|     | B     | ¬B    |
| --- | ----- | ----- |
| A   | $x_1$ | $x_2$ |
| ¬A  | $x_3$ | $x_4$ |

Additionally, B) "PRIORS", prior probabilities for each idealized probability table i.e. for each connector combined with a particular noise level are provided as a result from the output of the prior run of the method. The prior probabilities are obtained from steps G) and H).

The hypotheses probabilities $P_H$ for each logical probabilistic probability table PT are hypotheses probabilities for each connector combined with the particular noise level as follows:

$$P_H(\text{logical probabilistic } PT) = P_H(\text{connector} \wedge r_j).$$

In a step C), additional model parameters are provided for the basic model established in step D).

Additional model parameters can be for example converging probabilities c. For each probability table $P_{ij}$ the four c values, $c_{1ij}, c_{2ij}, c_{3ij}, c_{aij}$ (with $0 \leq c_{qij} \leq 1$) have to add up to one ($\Sigma_q c_{qij} = 1$). If the c values differ, they account for cases where noise is distributed in a biased way on different cells. However, for unbiased noise distributions the default setting is to use the same c values for all probability tables and all cells in a probability table, resulting in a general setting of c=0.25.

Additional model parameters can also be noise level resolutions given by the number n of equidistant noise levels. The highest resolution is Lim n→∞ (yielding continuous noise distributions for each connector).

Additional model parameters are also sampling parameters s, accounting for a known biased sampling process of frequency data and affecting both the systematic and noise components in a PT. A factor $s_{1ij}, s_{2ij}, s_{3ij}, s_{aij}$, is multiplied to each cell of a probability table. For an unbiased sampling process all s have the value one. For other values of s each cell of a PT is normalised by the resulting sum of the corresponding four cells, so that they again add up to 1. (In the following we will represent PTs with s=1 only.)

In a Step D) "basic model", representational assumptions are made. For each of the 16 dyadic logical connectors a set of idealized probability tables PTs is constructed. Associated with all probability tables PTs of a given connector are a second-order probability, a particular noise level r ($0 \leq r_j \leq 1$), and four cell probabilities calculated by a specifically defined formula comprising a particular noise level $r_j$ and converging probabilities c as variables. The model preferably uses t as the number of true cells in a connector (according to standard propositional logic) divided by the four (possible cells).

The following table provides an overview how the probability tables PTij for each connector are formalized.

| Truth table | Connector name | Nota-tion | Cell A & B | Cell A & ¬B | Cell ¬A & B | Cell ¬A & ¬B | t |
| --- | --- | --- | --- | --- | --- | --- | --- |
| $O_1$ | Verum / Tautology | A T B | $t_i - r_j(t_i - c)$ | $t_i - r_j(t_i - c)$ | $t_i - r_j(t_i - c)$ | $t_i - r_j(t_i - c)$ | .25 |
| $O_2$ | Inclusive disjunction | A ∨ B | $t_i - r_j(t_i - c)$ | $t_i - r_j(t_i - c)$ | $t_i - r_j(t_i - c)$ | $0 + r_j c$ | .33 |
| $O_3$ | Converse implication | A ← B | $t_i - r_j(t_i - c)$ | $t_i - r_j(t_i - c)$ | $0 + r_j c$ | $t_i - r_j(t_i - c)$ | .33 |
| $O_4$ | Implication | A → B | $t_i - r_j(t_i - c)$ | $0 + r_j c$ | $t_i - r_j(t_i - c)$ | $t_i - r_j(t_i - c)$ | .33 |
| $O_5$ | Exclusion | A ↑ B | $0 + r_j c$ | $t_i - r_j(t_i - c)$ | $t_i - r_j(t_i - c)$ | $t_i - r_j(t_i - c)$ | .33 |
| $O_6$ | Affirmation A | A | $t_i - r_j(t_i - c)$ | $t_i - r_j(t_i - c)$ | $0 + r_j c$ | $0 + r_j c$ | .50 |
| $O_7$ | Affirmation B | B | $t_i - r_j(t_i - c)$ | $0 + r_j c$ | $t_i - r_j(t_i - c)$ | $0 + r_j c$ | .50 |
| $O_8$ | Exclusive disjunction | A >< B | $0 + r_j c$ | $t_i - r_j(t_i - c)$ | $t_i - r_j(t_i - c)$ | $0 + r_j c$ | .50 |

-continued

| Truth table | | Connector name | Nota-tion | Cell A & B | Cell A & ¬B | Cell ¬A & B | Cell ¬A & ¬B | t |
|---|---|---|---|---|---|---|---|---|
| $O_9$ | ▧ | Biconditional | $A \leftrightarrow B$ | $t_i - r_j(t_i - c)$ | $0 + r_jc$ | $0 + r_jc$ | $t_i - r_j(t_i - c)$ | .50 |
| $O_{10}$ | ▧ | Negation B | $\neg B$ | $0 + r_jc$ | $t_i - r_j(t_i - c)$ | $0 + r_jc$ | $t_i - r_j(t_i - c)$ | .50 |
| $O_{11}$ | ▧ | Negation A | $\neg A$ | $0 + r_jc$ | $0 + r_jc$ | $t_i - r_j(t_i - c)$ | $t_i - r_j(t_i - c)$ | .50 |
| $O_{12}$ | ▧ | Conjunction | $A \wedge B$ | $t_i - r_j(t_i - c)$ | $0 + r_jc$ | $0 + r_jc$ | $0 + r_jc$ | 1 |
| $O_{13}$ | ▧ | (A but not B) | | $0 + r_jc$ | $t_i - r_j(t_i - c)$ | $0 + r_jc$ | $0 + r_jc$ | 1 |
| $O_{14}$ | ▧ | (B but not A) | | $0 + r_jc$ | $0 + r_jc$ | $t_i - r_j(t_i - c)$ | $0 + r_jc$ | 1 |
| $O_{15}$ | ▧ | Joint Denial | $A \downarrow B$ | $0 + r_jc$ | $0 + r_jc$ | $0 + r_jc$ | $t_i - r_j(t_i - c)$ | 1 |
| $O_{16}$ | ▧ | Falsum / Contradiction | $A F B$ | $0 + r_jc$ | $0 + r_jc$ | $0 + r_jc$ | $0 + r_jc$ | — |

Exemplary probability tables are provided for the conjunction A and B, affirmation A (A, whether B or not B) and the inclusive disjunction "A or B", wherein t is a number of true cells, $r_j$ is the noise level and c is the converging probability.

A) $A \circ_{12} B$ (A AND B)

Noise level 1:

| $A \wedge B$ | B | ¬B |
|---|---|---|
| A | $t - r_1 (t - c)$ | $0 + r_1c$ |
| ¬A | $0 + r_1c$ | $0 + r_1c$ |

Noise level 2:

| $A \wedge B$ | B | ¬B |
|---|---|---|
| A | $t - r_2 (t - c)$ | $0 + r_2c$ |
| ¬A | $0 + r_2c$ | $0 + r_2c$ |

Noise Level n:

| $A \wedge B$ | B | ¬B |
|---|---|---|
| A | $t - r_n (t - c)$ | $0 + r_nc$ |
| ¬A | $0 + r_nc$ | $0 + r_nc$ |

Here the t value for the true cells is t=1.

B) $A \circ_7 B$ (A, whether B or not B)

Noise level 1:

| | B | ¬B |
|---|---|---|
| A | $t - r_1 (t - c)$ | $t - r_1 (t - c)$ |
| ¬A | $0 + r_1c$ | $0 + r_1c$ |

Noise level 2:

| | B | ¬B |
|---|---|---|
| A | $t - r_2 (t - c)$ | $t - r_2 (t - c)$ |
| ¬A | $0 + r_2c$ | $0 + r_2c$ |
| | ... | |

Noise Level n:

|   | B | ¬B |
|---|---|---|
| A | t − $r_n$(t − c) | t − $r_n$(t − c) |
| ¬A | 0 + $r_n$c | 0 + $r_n$c |

Here the t value for the true cells t is t=0.5.

C) A$\bigcirc_2$B (A OR B)

Noise level 1:

|     | B | ¬B |
|-----|---|----|
| A∨B |   |    |
| A   | t − $r_1$(t − c) | t − $r_1$(t − c) |
| ¬A  | t − $r_1$(t − c) | 0 + $r_1$c |

Noise level 2:

|     | B | ¬B |
|-----|---|----|
| A∨B |   |    |
| A   | t − $r_2$(t − c) | t − $r_2$(t − c) |
| ¬A  | t − $r_2$(t − c) | 0 + $r_2$c |

Noise Level n:

|     | B | ¬B |
|-----|---|----|
| A∨B |   |    |
| A   | t − $r_n$(t − c) | t − $r_n$(t − c) |
| ¬A  | t − $r_n$(t − c) | 0 + $r_n$c |

Here the t value of the true cells are t=0.33.

Generally, it is preferred that the value for a case that would logically true is taken to be t-$r_j$(t-c), and the value of a false cell $r_j$c.

In a step E), a field of probabilities given the postulated probability tables PTs are determined e.g. by software supported data processing. The calculation is based upon four frequencies $x_1$, $x_2$, $x_3$ and $x_4$ with N=Σ$x_i$ and the probabilities $p_i$ for each frequency $p_i^{x_i}$. For each logical connector, the calculated field of probabilities are e.g. as follows:

$$P(x_i \mid N, p_m) = \binom{N}{x_1 x_2 x_3 x_4} p_1^{x_1} p_2^{x_2} p_3^{x_3} p_4^{x_4}.$$

A) A$\bigcirc_{12}$B (A AND B)

Noise level 1:

$$P(D \mid PT_{AND,r1}) = \binom{N}{x_1 x_2 x_3 x_4} p_1^{x_1} p_2^{x_2} p_3^{x_3} p_4^{x_4}.$$

Noise level 2:

$$P(D \mid PT_{AND,r2}) = \binom{N}{x_1 x_2 x_3 x_4} p_1^{x_1} p_2^{x_2} p_3^{x_3} p_4^{x_4}.$$

Noise level n:

$$P(D \mid PT_{AND,m}) = \binom{N}{x_1 x_2 x_3 x_4} p_1^{x_1} p_2^{x_2} p_3^{x_3} p_4^{x_4}.$$

B) A$\bigcirc_7$B (ONLY A)

Noise level 1:

$$P(D \mid PT_{A,r1}) = \binom{N}{x_1 x_2 x_3 x_4} p_1^{x_1} p_2^{x_2} p_3^{x_3} p_4^{x_4}.$$

Noise level 2:

$$P(D \mid PT_{A,r2}) = \binom{N}{x_1 x_2 x_3 x_4} p_1^{x_1} p_2^{x_2} p_3^{x_3} p_4^{x_4}.$$

Noise level n:

$$P(D \mid PT_{A,m}) = \binom{N}{x_1 x_2 x_3 x_4} p_1^{x_1} p_2^{x_2} p_3^{x_3} p_4^{x_4}.$$

C) A$\bigcirc_2$B (A OR B)

Noise level 1:

$$P(D \mid PT_{OR,r1}) = \binom{N}{x_1 x_2 x_3 x_4} p_1^{x_1} p_2^{x_2} p_3^{x_3} p_4^{x_4}.$$

Noise level 2:

$$P(D \mid PT_{OR,r2}) = \binom{N}{x_1 x_2 x_3 x_4} p_1^{x_1} p_2^{x_2} p_3^{x_3} p_4^{x_4}.$$

Noise level n:

$$P(D \mid PT_{OR,m}) = \binom{N}{x_1 x_2 x_3 x_4} p_1^{x_1} p_2^{x_2} p_3^{x_3} p_4^{x_4}.$$

The same is done for all other connectors. The likelihoods of the postulated logical $PTs_{ij}$ may then additionally be weighted, due to their noise level as described previously.

In a step F), the normalizing probability P(D) of the data D under all hypotheses $H_k$, i.e. all connectors under certain combinations $O_i \times r_j$ is given by:

$$P(D) = \sum_{i=1}^{16} \sum_{j=1}^{n} P(D \mid PT_{Oi,rj}) P(PT_{Oi,rj}).$$

In a step G), "Bayesian Update", a field of the probabilities of these probability tables PTs given the data is calculated in order to obtain the posterior probabilities of each combination of connector and uncertainty level $H_k$ given the observed pattern of data D. The update is made by use of Bayes' theorem:

$$P(H_k \mid D) = \frac{p(d \mid H_k)}{P(D)}.$$

For the exemplary logical connectors "AND", "ONLY" and "OR", the update process is as follows:

A) $A\circ_{12}B$ (A AND B)

Noise level 1:

$$P(PT_{AND,r1} \mid D) = \frac{P(D \mid PT_{AND,r1})P(PT_{AND,r1})}{P(D)}$$

Noise level 2:

$$P(PT_{AND,r2} \mid D) = \frac{P(D \mid PT_{AND,r2})P(PT_{AND,r2})}{P(D)}$$

...

Noise level n:

$$P(PT_{AND,m} \mid D) = \frac{P(D \mid PT_{AND,m})P(PT_{AND,m})}{P(D)}$$

B) $A\circ_7B$ (ONLY A)

Noise level 1:

$$P(PT_{A,r1} \mid D) = \frac{P(D \mid PT_{A,r1})P(PT_{A,r1})}{P(D)}$$

Noise level 2:

$$P(PT_{A,r2} \mid D) = \frac{P(D \mid PT_{A,r2})P(PT_{A,r2})}{P(D)}$$

...

Noise level n:

$$P(PT_{A,m} \mid D) = \frac{P(D \mid PT_{A,m})P(PT_{A,m})}{P(D)}$$

C) $A\circ_2B$ (A OR B)

Noise level 1:

$$P(PT_{OR,r1} \mid D) = \frac{P(D \mid PT_{OR,r1})P(PT_{OR,r1})}{P(D)}$$

Noise level 2:

$$P(PT_{OR,r2} \mid D) = \frac{P(D \mid PT_{OR,r2})P(PT_{OR,r2})}{P(D)}$$

...

Noise level n:

$$P(PT_{OR,m} \mid D) = \frac{P(D \mid PT_{OR,m})P(PT_{OR,m})}{P(D)}$$

As a default these posteriors are used to update the filed of priors in B, to use them in the next update process.

In a step H) data are integrated and output data are obtained. Overall pattern-sensitive posteriors of each logical connector aggregating over noise levels is determined as follows:

A) $A\circ_{12}B$ (A AND B):

$$P(AND \mid D) = \sum_j P(PT_{AND,rj} \mid D)$$

B) $A\circ_7B$ (ONLY A):

$$P(A \mid D) = \sum_j P(PT_{A,rj} \mid D)$$

C) $A\circ_2B$ (A OR B)

$$P(OR \mid D) = \sum_j P(PT_{OR,rj} \mid D)$$

Further, pattern-sensitive posteriors of noise levels weighted by connectors are calculated as follows:

$$P(r_1 \mid D) = \sum_j P(PT_{oi,r1} \mid D)$$

$$P(r_2 \mid D) = \sum_j P(PT_{oi,r2} \mid D)$$

$$P(r_n \mid D) = \sum_j P(PT_{Oi,m} \mid D).$$

Additionally, a simple measure of information gain or support for these pattern-based probabilities for connectors, and noise levels, and the original combinations of connectors with noise levels may be calculated preferably using $P(A\circ_iB \mid D)-P(A\circ_iB)$, $P(r_j \mid D)-P(r_j)$, $P(A\circ_iB \& r_j \mid D)-P(A\circ_iB\&r_j)$, Main properties of this particular pattern-based and noise-based kind of Bayesian logics of testing whole connectors (not subsets) are:

The resulting logical hypotheses probabilities $P_H(A\circ_iB)$ differs from extensional probability $P_E(A\circ_iB)$.

The hypotheses probability $P_H(A\circ_iB)$ is sensitive to frequency shifts within the true cases of a connector whose probability is tested, and to frequency shifts within the false cases of a connector.

Even if the extensional probabilities of all cells in a contingency table are kept identical, only varying sample size can lead to changes in the rank order of the hypothesis probabilities $P_H(A\circ_iB)$ of different connectors.

The hypotheses probability $P_H (A \circ_j B)$ makes specific predictions for noise levels, sampling biases, prior knowledge concerning connectors or noise, alternative hypotheses, etc.

if $(A \circ_i B) (A \circ_2 B)$ there may be $P(A \circ_1 B) < P(A \circ_2 B)$.

Additional Comments

The basic principles of the System and Method for inductive determination of pattern probabilities of all 16 dyadic logical connectors are explained in more detail in the following.

The Additivity of Probability in Classical and Non-Classical Probability Theories It is a basic truth of standard extensional probability theory that the probability of an event set X can never become larger than the probability of an event set Y if the latter includes the intension (sense) and hence the extension (actual elements of a set) of the former (inclusion rule: for $X \subset Y$, $P(X) \leq P(Y)$). Applied to logical connectors and particularly to conjunctions, no conjunction '$A \wedge B$' can be more probable than one of its components, 'A' or 'B', since the intersection of two components is a subset of each single one. A conjunction '$A \wedge B$' is true only in cases in which A&B cases are given, whereas, for instance, 'A' is additionally true for A& Non-B cases. Correspondingly, probabilities generally have to satisfy the conjunction rule:

$$P(A) \geq P(A \wedge B); P(A \wedge B) \leq P(B) \quad (1)$$

If the sets A& Non-B and Non-A&B are not empty, probability judgments additionally have to satisfy the 'strict conjunction rule':

$$P(A) > P(A \wedge B); P(A \wedge B) < P(B) \quad (2)$$

With regard to the classical axioms of probability theory of Kolmogorov, the conjunction rules can be derived directly from his third axiom. The first two axioms only state that probabilities are positive (non-negativity) and that a true proposition has the probability of one (normalization). The most problematic axiom is the third axiom of (finite) additivity (sometimes 'σ-additivity'). The probability of an event set, which is the union of n other disjoint subsets of events is the sum of the probabilities of those subsets:

$$P(E_1 \cup E_2 \cup \ldots \cup E_n) = \Sigma P(E_i) \quad (3)$$

There are alternative calculi of probability or belief which have abandoned or extended the axioms of probability theory. The most prominent approaches are the Dempster-Shafer theory of belief functions, Cohen's Baconian probabilities, and different formalizations of multi-valued or fuzzy logic.

The belief functions postulated by the Dempster-Shafer theory are indeed non-additive. Although a violation of the conjunction rule (Equation 1) implies a violation of additivity (Equation 3), vice versa violation of additivity does not imply a violation of the conjunction rule. Actually, the Dempster-Shafer theory is formulated in accordance with Equation 2. Likewise, Baconian probabilities of conjunctions may violate Equation 3—they are equal to the minimum of the probabilities of their conjuncts—but they do not violate Equation 1. Finally, in multi-valued or fuzzy logic there are quite different t-norms (Lukasiewicz, Gödel, product) formalizing conjunctions, but these t-norms are all consistent with $P(A) \leq P(A \wedge B)$.

To sum up, although these non-classical formalizations of probability or belief give up additivity, they adhere to the conjunction rule. Also, in psychology the conjunction rule has been regarded as being one of the most basic and universal laws of probability.

The conjunction Fallacy Debate in Psychology

Since the conjunction fallacy debate in psychology became a paradigmatic case for the 'heuristics and bias' research program, tasks like the Linda task have held center-stage in this discussion. The Linda Task was introduce by Tversky and the later Nobel laureate Kahneman to test intuitive probability judgments. Linda is described like a stereotype feminist. Then subjects had to rank sentences according to their probability, like "Linda is a bank teller" (A), "Linda is a feminist" (A&B). Actually many participants committed a conjunction fallacy: P(A&B)>P(B). This elicited a heated debate in the cognitive sciences. Answers assumed to be made on the basis of their representativeness seemed to deviate from the laws of probability. In the subsequent debate, each minutiae of the Linda task and its interpretation came under closer scrutiny. Representativeness was criticized as being defined too vaguely to count as a fully satisfying explanation.

Exculpating Linguistic or Pragmatic Factors?

One kind of problem concerned subtle linguistic or pragmatic aspects of the task which may have made the interpretation of 'B' (bank teller) and of 'B and F' (bank teller and feminist) logically ambiguous. This may exculpate participants from committing a fallacy. The postulated fallacy needs to take place on the level of meaning (propositions), not on the level of sentences. However, both ordinary language terms 'B' and 'B and F' are ambiguous, and conversational inferences may lead to different logical interpretations.

Firstly, in natural language, 'A and B' must not always be interpreted as a logical conjunction '$A \wedge B$', with the truth table function '1, 0, 0, 0 ' (for the cases A&B, A& $\neg$B, $\neg$A&B, $\neg$A& $\neg$B, and '1'='true', '0'='false'). It is argued convincingly that the sentence, "We invite friends and colleagues to the party," does not refer to the logical conjunction '$A \wedge B$' and the corresponding intersection, which would exclude friends who are not colleagues and colleagues who are not friends. Here the 'and' of natural language logically refers to the inclusive OR (disjunction, $\vee$) of friends, colleagues, or both (with the truth function '1, 1, 1, 0'). It was suggested that the phrase 'bank tellers who are active in the feminist movement' would exclude this unintended interpretation as union. This strict formulation may stress the nested-set relation, thereby eliciting extensional reasoning (instead an "and are" formulation was proposed). In any case, when using the stricter 'who are' formulation studies had shown that conjunction fallacies will not be predicted.

Secondly, a statement or hypothesis 'A', if presented together with a statement 'A and B', does not need to be interpreted as the dyadic connector 'affirmation A' (with the truth function '1, 1, 0, 0 '), but instead may be interpreted as 'A but not B' ('0, 1, 0, 0'). "Linda is a bank teller and is active in the feminist movement" might prompt an interpretation of "Linda is a bank teller" as "Linda is a bank teller and not active in the feminist movement". Actually, this problem was tried to remove by using the phrase "Linda is a bank teller whether or not she is active in the feminist movement," but this reduced the number of observed conjunction fallacies. In any case, in our studies we used this stricter formulation to avoid an 'A but not B implicature'.

Effects of Task Formats and Frequentist Account of Probability

Other objections concerned the role of frequencies instead of single-event probabilities and other different task formats that appear to facilitate 'correct' solutions in Linda tasks. Frequency judgments concerned with 100 hypothetical persons fitting Linda's description significantly reduced the portion of conjunction fallacies. Inspired by these early findings, the debate on the conjunction fallacy became intimately linked to the discussion of different tasks formats.

In any case, it is recommended to use both explicit frequency information and clear set inclusions.

Polysemous and Vague Terms: 'Probability' and 'Representativeness' The term probability is ambiguous, including meanings like 'believability', 'degree of confidence', 'imaginability', or 'plausibility'. As outlined above, violations of the conjunction rule do not need to be interpreted as irrational fallacies as long as they occur with single-event probabilities since a frequentist account of probability is not applicable. More generally, it has been objected to a content-blind application of norms like the conjunction rule. However, domain-specific accounts that are still normative should be advocated simply by relating norms to given preconditions. In any case, the paraphrased meaning of the word 'probability' is polysemous, whereas the natural language sense of 'frequency' is 'primarily mathematical'. The Bayesian logic actually formalises intuitive pattern-sensitive notion of probability. However, the model is formulated as a rational mathematical account. Likewise, some mathematically-specified theories of the conjunction fallacy can be interpreted as at least semi-rational and mathematical alternatives to extensional probability.

The definition of representativeness goes beyond a 'one-word explanation', by explicitly distinguishing two sub-processes: A first step of evoking the representation of a prototype linked to one category (feminist) and a second step of judging the similarity of Linda with that prototypical exemplar. Although Bayesian logic inherits properties of representativeness in a broader sense, it makes different predictions and provides a more formal and rational account.

Bayesian logic can be used as a novel explanation of conjunction fallacies, consistent with most previous qualitative and quantitative findings.

The Bayesian Logic of the Conjunction Fallacy

Building on the idea that 'probability' is polysemous, an alternative to the standard extensional interpretation of the probability of logical relations is proposed that is neither non-mathematical nor irrational. Its predictions differ from all other current theories of the conjunction fallacies.

The proposed pattern-sensitive inductive Bayesian logic of hypothesis testing ('Bayesian logic', 'Bayes logic', or 'Bayesian logic' for short) provides probabilities about hypotheses concerned with logical relations and whole situations (not only with particular subsets, as suggested in previous Bayesian models).

Bayesian logic rationally calculates a pattern-sensitive probability of hypotheses that an observed data pattern (here a 2×2 contingency matrix), has been generated by hypothetical 'probability tables', corresponding to ideal 'probabilistic truth tables'. The probability of a connector will be calculated summing over the probabilities of the hypothesis on different 'noise levels', which are themselves calculated based on the data. Bayesian logic is formulated on a functional or 'computational' level, and does not address the 'algorithmic' level.

Although Bayesian logic makes use of standard probability theory and extensional dyadic propositional logic, on the emergent level of description relevant here, it does not subscribe to extensionality (sets with equal elements do not have to have the same probability), or, more particularly, to the conjunction rule (Equation 1).

Based on an observed pattern of data, D, Bayesian logic specifies the posterior probability, $P(H_i|D)$, of alternative 'logical' hypotheses, $H_i$, like 'pupils from a Linda school generally become bank tellers' (A) or 'they generally become bank tellers and feminists' (A and B). The resulting hypothesis probability, $P_H A$, is not concerned with the extension of subsets ($P_E(X)$), but with patterns characterizing whole situations. It is assumed that frequency information should have a similar effect to providing characterizations of Linda in traditional single-event tasks. Hence, unlike most previous studies, there is a concern (a) with explicitly specified frequency data and (b) a complete absence of a story characterizing Linda. Bayesian logic claims that conjunction fallacies are general phenomena that should reasonably occur even on the basis of fully transparent tasks and frequency information in contingency tables only.

The Model (1.) The main mathematical input for the following exposition of Bayesian logic will be natural frequency information given in a 2×2 contingency table resulting from N independent observations: $x_a+x_b+x_c+x_d=N$, with N>0 (cf. Table 1).

TABLE 1

Observed Frequencies x in the Four Cells of a Contingency Table Summarizing the Covariation Between Two Binary Events.

|  | Feminist (B) | No feminist (Non-B) |
|---|---|---|
| Bank teller (A) | $x_a$ | $x_b$ |
| No bank teller (Non-A) | $x_c$ | $x_d$ |

This frequency may be directly observable or retrieved from memory. In order to establish a contingency table in the first place, a given universe of discourse has to be presupposed; in our studies, for instance, the known graduates of a particular Linda school. The same frequency input can be used to determine the standard extensional probability of some logical connector $P_E(A \circ B)$, by calculating (the limit of) the ratio of favorable events divided by the overall number of events in a universe of discourse, for instance, $P_E(A \wedge B) = x_a/N$, or $P_E(A) = (x_a+x_b)/N$).

As another input, Bayesian logic assumes prior probabilities of the hypotheses (probability tables based on connectors and noise levels). In a study, the laboratory setting suggested a flat uninformative prior distribution for all logical hypotheses and all noise-levels. Formally, there are two further sets of parameters $c_i$ and, n. In the current context, both sets of parameters were fixed in advance and should not be seen as free parameters (see below).

(2.) Similar to other kinds of multi-valued or fuzzy logics, this Bayesian logic replaces the two values 'true' ('T' or '1') and 'false' ('F' or '0') of bivalent propositional logic by truth values in the interval [0, 1], normally used for probabilities. On the logical side, Bayesian logic is basically still concerned with all 16 possible dyadic connectors of propositional logic (like AND, OR, etc.), connecting two atomic propositions A and B: '$A \bigcirc_i B$'.

More specifically, Bayesian logic assesses second order probabilities, probabilities for hypotheses ($P_H(X)$) that again each concern four probabilities, $P_{PT}(X)$, or a 'probability table' (PT). These probability tables are probabilistic analogues to deterministic truth tables. Dyadic Bayesian logic is confined to probability tables based on tuples of four probabilities, each relating to a cell in a particular PT:

$$P_{PT}(A\&B)+P_{PT}(A\&\neg B)+P_{PT}(\neg A\&B)+P_{PT}(\neg A\&\neg B)=p_a+p_b+p_c+p_d=1.$$

probability tables are hypothetical (and in a week sense 'a priori) constructs of the model ('Kantian entities'). They are needed to build up a pattern-sensitive Bayesian logic. However, each PT has a probability and can be tested against data. probability tables are here seen as a logical description of possible and probabilistic dispositions or propensities of a situation to produce certain attributes. The probability tables are linked to connectors and noise by the assumption of idealization and the assumption of uncertainty, selecting a subset out of all possible probability tables to model simultaneously connectors and specific levels of noise.

(3.) According to the assumption of idealization, an ideal connector has an equal probability distribution for all true logical cases. For each hypothetical logical connector, $O_I$ (I indexes the 16 connectors), there is a need to specify probabilities in corresponding probability tables, based on whether the connector defines a case to be true (T) or false (F). In the cases of no random variation (R=0) and resulting deterministic relationships (with all $P_{PT}(F)$=0), the ideal probability of a cell which is hypothetically 'true', is negatively proportional to the number of true cells, $N(T_I)$, of a particular connector/under investigation: $P_{PT}(T|O_I$ and $R$=0)=$1/N(T_I)$=$t_I$. This turns deterministic truth tables into deterministic probability tables, based on probabilities adding up to one.

Table 2 shows the ideal deterministic probability tables for the conjunction 'A AND B', the affirmation 'A', and the (inclusive) disjunction 'A OR B'. 'A OR B' is shown here instead of 'only B' to indicate that Bayesian logic in principle provides a general model for all 16 connectors of propositional logic. Probability tables for a B hypotheses are modeled analogously to an A hypotheses.

FIG. 2 presents related exemplary graphs of the resulting pattern probabilities $P_H(A \wedge B)$, $P_H(A)$, and $P_H(B)$, for uncertainty levels r between 0.1 and 1.0 ($P_H(A \circ_I B.r|D)$ (left graphs) and summing up over all levels ($P_H(H_I|D)$) (right graphs), given the observed frequencies.

The assumption of idealization reflects the idea that the ideal deterministic PT of a conjunction should, for instance, not be regarded as ideal for an inclusive disjunction, although the sum of confirming probabilities would be the same for both connectors. The measure $t_I$ of a PT is not a free parameter, but follows for each connector directly from the assumption of idealization.

(4.) The assumption of uncertainty asserts a general overall level of uncertainty (noise, error, or randomness), R=r, for a natural set of independent observations of a relation, resulting from a process of natural sampling. This assumption corresponds to the fact that we live in an uncertain world, with only probabilistic relations (objective uncertainty) or limited knowledge (subjective uncertainty). Correspondingly, a particular $PT_{I,j}$ is here assumed to have one overall level of uncertainty, $r_j$, for all cells of the table. (Psychologically, 'noise' may alternatively be understood as a particular causal factor leading to other patterns. Here noise is an abstract measure used to calculate pattern probabilities. For more complex situations the noise assumption may be modified.) The noise variable has a value $r_j$ ($0 \leq r \leq 1$) that may be fixed by prior knowledge or its posterior probability can be calculated from the model itself. As mentioned, for the present studies there is a general assumption of equal priors $P(r_j, o_i)$ for all modeled steps of the noise levels j, estimating their posterior probabilities from the objective learning input.

Mathematically, the probability of a false cell in a PT with $r_j$=0 is generally zero: $P_{PT}(F|r_j=0)$=$f$=0. Reasonably it will turn out that only such probability tables can be completely discarded by a single disconfirmatory observation (a falsification). In contrast, for probability tables, whose error term approaches its maximum ($r_j$=1), the cell probabilities of any connector $O_I$ should converge at a pattern that have the same 'convergence probabilities' c, in all four cases of a PT. Here c is generally assumed to be uniform (c=0.25). Note that this is only the case if we are concerned with data from an unbiased natural sampling process. Since this can plausibly be assumed for our studies, c should here be interpreted as a constant and not as a free parameter. More generally (for all $0 \leq r_j \leq 1$), the probability of a false cell for any $PT_{I,j}$ (based on a logical connector and a noise level) is formalized by $P_{PT}(F)$=$r_j*c$, so that an increasing $r_j$ leads to increased probabilities ($0 \leq P_{PT}(F) \leq c$). The probability of a true case, T, has to be reduced, if noise increases: $P_{PT}(T)$=$t_I$-$r_j(t_I$-$c)$, with $c \leq P_{PT}(T) \leq t$.

Table 2a, b, c

Ideal Deterministic probability tables for Three Different Connectors $O_i$ (with R = 0).

| Table 2a | | | Table 2b | | | Table 2c | | |
|---|---|---|---|---|---|---|---|---|
| A AND B | B | Non-B | A | B | Non-B | A OR B | B | Non-B |
| A | $t_{AandB}=1$ | 0 | A | $t_A=0.5$ | $t_A=0.5$ | A | $t_{AorB}=0.33$ | $t_{AorB}=0.33$ |
| Non-A | 0 | 0 | Non-A | 0 | 0 | Non-A | $t_{AorB}=0.33$ | 0 |

Table 3a, b, c

Probability Tables for Three Different Connectors $O_I$ and Different Uncertainty Levels ($R_j = r$).

| Table 3a | | | Table 3b | | | Table 3c | | |
|---|---|---|---|---|---|---|---|---|
| A AND B | B | Non-B | A | B | Non-B | A OR B | B | Non-B |
| A | t − (t − c)r | cr | A | t − (t − c)r | t − (t − c)r | A | t − (t − c)r | t − (t − c)r |
| Non-A | cr | cr | Non-A | cr | cr | Non-A | t − (t − c)r | cr |

Note.

In case of maximal uncertainty the cell probabilities converge at c, which is here generally set to 0.25.

This formalization of noise levels is coherent with the idea that from the generative probability of all logically true cases of a connector a portion r is equally distributed over all four possible cases (including other true cases). Table 3 summarizes the general formulation of the probabilistic probability tables of the hypotheses 'A AND B', 'A' and 'A OR B' for all noise levels.

Each hypothetical connector is combined with all hypothetical noise levels. To calculate the posterior probability of the noise levels for our experiments, R was actually modeled as a discrete variable only (in steps of 0.10). However, the idea could be extended to continuous error distributions. More crucially, the basic concepts of the model specify a two-dimensional orthogonal field of probability tables, ordered by connector and noise level (cf. FIG. 1). We write $PT_k$ to represent all hypothetical probability tables combining a connector with an uncertainty level ($H_k = PT_k = PT(O_l \wedge R_i)$). Thus, Bayesian logic specifies a subset of possible probability tables, which shall be called 'logical probability tables', specifying ideal connectors combined with error levels as latent generative constructs.

(5.) After having introduced basic assumptions and first steps of the model, we can now calculate the probability of observed data patterns given a combined connector-noise hypothesis, $P(D|H_k)$. A data pattern, ordered in a 2×2 contingency matrix, D, consists of four frequencies, $x_a$, $x_b$, $x_c$, $x_d$ (with $\Sigma x = N$, cf. Table 1). The multinomial distribution gives the discrete probability distribution $P(x_a, x_b, x_c, x_d | p_a, p_b, p_c, p_d) = P(D | PT_k)$ of obtaining a particular pattern of the disjoint outcomes, in a total sample of N independent trials, given a hypothesis (a PT) with the respective probabilities $p_a$, $p_b$, $p_c$, $p_d$ (with $0 \leq p_m \leq 1$, $\Sigma p_m = 1$):

$$P_H(D | PT_k) = \binom{N}{x_a x_b x_c x_d} p_a^{x_a} p_b^{x_b} p_c^{x_c} p_d^{x_d} \qquad (4)$$

For a given data pattern and each $PT_k$ specified by the model $P(x_a, x_b, x_c, x_d | PT_k)$ is calculated.

(6.) In order to calculate the posterior probabilities of each connector-uncertainty hypotheses, given the observed pattern of data, D, Bayes' theorem is used:

$$P_H(PT_k | D) = \frac{P(D | PT_k) P(PT_k)}{P(D)} \qquad (5)$$

The normalizing probability P(D), the probability of the data under all hypotheses $H_k$ (connector-noise combinations, $O_l \wedge R_i$) is calculated by:

$$P(D) = \sum_k P(D | PT_k) P(PT_k) \qquad (6)$$

Hence, the two-dimensional field of posterior probabilities of connector-noise hypotheses given some data can be calculated. Based on these posteriors, $P(PT_k, D)$, one may additionally calculate the change of the prior probabilities, $P(PT_k)$, as a measure of support or confirmation, for instance, by the following formula.

$$P_{H,Dif}(PT_k, D) = P_H(PT_k | D) - P_H(PT_k) \qquad (7)$$

However, this additional step is not necessary to account for conjunction fallacies. Bayesian logic predicts 'rational conjunction fallacies' even on the level of posterior probabilities (cf. predictions).

(7.) Since conjunction fallacy tasks are concerned with dyadic logical hypotheses ($H_l = A \bigcirc_l B$) over all possible error levels, we have to formulate an integration rule to determine their global probability. We calculate for each $H_l$ the sum of the posterior probabilities over all error levels $r_j$, directly resulting in a probability mass function:

$$P_H(H_l | D) = \sum_j P_H(PT_{l,j} | D) \qquad (8)$$

This provides us with the sought-after second order probabilities for logical hypotheses concerned with patterns, $P_H(A \bigcirc_l B)$. Analogously, the model can determine the probabilities for global noise levels by summing up over all hypotheses.

Predictions of Bayesian Logic

The proposed of inductive Bayesian logic provides a suitable alternative to traditional extensional probability, not replacing it, but supplementing it. Bayesian logic (paradoxically itself based on extensional probabilities) is a formalization of pattern-sensitive second-order probabilities for alternative hypotheses of connectors corresponding to probabilistic truth tables ($P_H(A \bigcirc B)$ for short). This kind of Bayesian posterior probability changes if the distribution of cases within a set is modified, even if the extension of the set remains constant. In contrast, the direct application of extensional probability, $P_E(A \bigcirc B)$, is determined by extensions, not by distributions, since it is defined by the number of true cases of a logical connector relative to all cases. Accordingly, $P_H(A \bigcirc B)$ may substantially differ from $P_E(A \bigcirc B)$. The proposed system of Bayesian logic makes qualitative as well as quantitative predictions about the occurrence of conjunction fallacies, which do not need to be irrational at all.

Qualitative Predictions

From the preconditions of the model, one can derive qualitative constraints for situations in which the model should be applicable, both in a normative respect and, presumably, in a descriptive respect. A pre-dominant content-blind application of universal norms in cognitive science has correctly been castigated. Although Bayesian logic is formulated as a normative model, even its normative applicability depends on whether its main assumptions are (subjectively) fulfilled in the first place. These preconditions can be given in particular 'domains' of application—in this sense one may call it a 'domain-specific rational model'.

The model, for instance, assumes that the hypotheses are understood as alternatives and that they refer to whole situations rather than only to subsets. If these preconditions of the model are met, it should be possible to achieve a substantial portion of 'conjunction fallacies', even if one uses situations that have previously been shown to reduce conjunction fallacies simultaneously, including highly-transparent within-subjects tasks, natural frequency information, a ranking response format, clear set-inclusions, and clarified logical formulations.

Although previous research has shown that all these cues tend to elicit an extensional interpretation of probability, it is assumed that one may counterbalance these cues.

It should be noted that Bayesian logic, as formulated here, does not directly address conjunction fallacies in the traditional Linda task. Although frequencies were taken as a measure to reduce conjunction fallacies, Bayesian logic is formulated here as a frequency-based account. Hence, Bayesian logic rather links to the frequency versions of the Linda task, where participants were requested to imagine 100 Linda's characterized by the Linda story. According to Bayesian logic one should expect that conjunction fallacies should not be limited to single-event probabilities, but should additionally occur in fully transparent tasks, with full frequency information even in a contingency table and without any narrative characterizing Linda. Nonetheless, one may also link single-case Linda tasks with Bayesian logic by assuming that the narratives in standard Linda tasks provide participants with either direct estimates for the probabilities of logical probability tables or indirectly with estimates of how a hypothetical larger sample of Lindas (all fitting the description) would be distributed in a contingency table. In these tasks it can be assumed that the frequency distributions of the cells often corresponded to (f(feminist & no bank teller)>>f(feminist & bank teller)>f(no feminist & bank teller) which would correspond to the pattern probabilities $P_H$(feminist)>>$P_H$(feminist & bank teller)>$P_H$(bank teller). However, this idea only becomes viable if it can be shown here that conjunction fallacies occur after explicitly obtaining knowledge about frequencies in transparent tasks with contingency tables, even without any other narrative characterization of Linda.

Quantitative Predictions

Inductive Bayesian logic makes predictions concerning pattern probabilities, $P_H(A \circ B)$, often differing from extensional probabilities, $P_E(A \circ B)$. Eight predictions will be derived in the following example from the outlined Bayesian model, of which the first three had been exemplarily tested by the inventor:

Firstly, quantitative conditions of double conjunction fallacies, secondly, differential sample size effects, and, finally, internal and external pattern-sensitivity.

It is later shown that even these three predictions are sufficient to delineate Bayesian logic from previous models of the conjunction fallacy.

The predictions being outlined in the following have to be applied with the following restrictions.

Firstly, if not mentioned otherwise, flat priors are assumed.

Secondly, it should kept in mind that all predictions are only valid as long as the participant's interpretation of the term 'probability' corresponds to $P_H(A \circ B)$ and not to $P_E(A \circ B)$.

Double conjunction 'fallacies'. Bayesian logic predicts double conjunction fallacies for natural frequency data and the quantitative conditions of their occurrence. Double conjunction fallacies are probability judgments with P(A)<P(A∧B) and P(A∧B)>P(B), or with P(B)≦P(A∧B) and P(A∧B)≦P(A) (for $P_E$(A∧non-B)>0 and $P_E$(non-A∧B)>0).

Many theories of the conjunction fallacy have not predicted double conjunction fallacies, but only single conjunction fallacies. The research on representativeness and Linda has at least concentrated on single conjunction fallacies, like P(bank teller)<P(feminist∧bank teller), and situations triggering a prototype relating only to one of the components (feminist). Here the conjunction is more similar (feature overlap) to this prototype than the other compound. Most experiments on the Linda task did not even investigate the conjunction together with both components.

FIG. 4 shows the model's posterior probabilities for flat priors and several different input frequencies. For each example two graphs are shown to illustrate the absolute output of the model for the logical hypotheses in question, 'A∧B', 'A', and 'B'. The left graph shows the posterior probabilities (ordinate) of the hypotheses ordered by noise levels (abscissa). The graph on the right shows the actually resulting posterior probabilities of the logical hypotheses, integrating over all noise levels. Bayesian logic does not need to assume a full rational or interval scale level when applying these predictions to rating scales. One may additionally use logit transformation to fit the data. Subjects may make their judgments in some relative way and may emphasize small differences. However the main predictions are clear.

Figure 3:
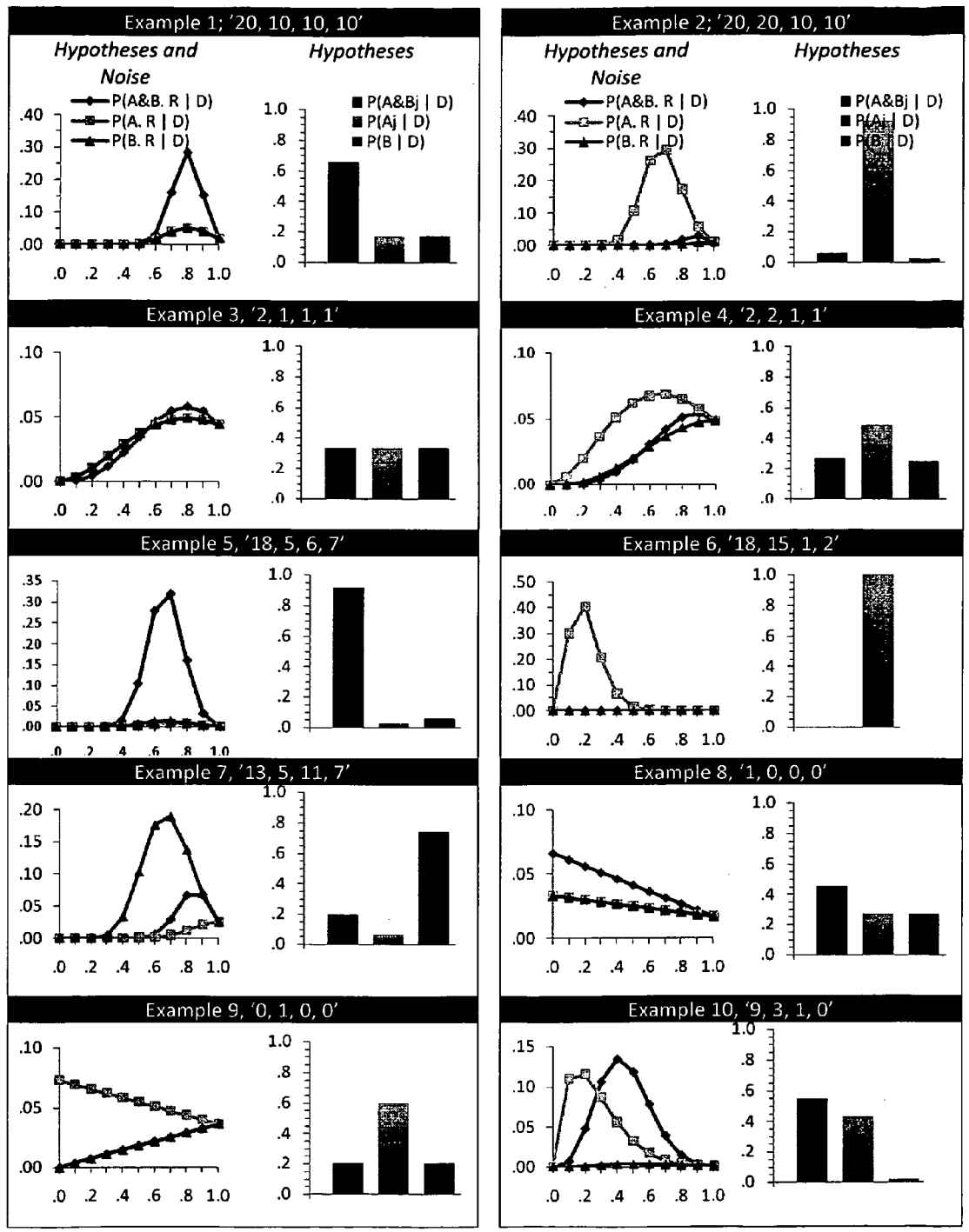
FIG. 3: Graphs describing model behaviour for given data.

Example 1 shows predictions for contingency table with $x_a=20$, $x_b=10$, $x_c=10$, $x_d=10$ (cf. Table 1 and FIG. 3). For example, these frequencies may correspond to basketball players in some professional team who may be tall (A), speedy (B) or both (A∧B). For such frequencies, observed or retrieved from memory, an AND hypothesis should be estimated more probable than each of the components respectively (FIG. 3, second graph). The first graph indicates that the ordinal predictions for this data set are quite independent from the priors of the noise levels. The second example (FIG. 3), based on the frequencies $x_a=20$, $x_b=20$, $x_c=10$, and $x_d=10$, predicts hypothesis A to be dominant: $P_H(A \wedge B) < P_H(A) > P_H(B)$. Here comparisons of 'A∧B' and 'B' should increase the frequency of single conjunction fallacies since the pattern probability of the conjunction, $P_H(A \wedge B)$, is relatively higher than $P_H(B)$. If subjects are forced to rank $P_H(A \wedge B)$ versus $P_H(B)$ it depends on the assumed resolution of subjective probabilities (for $P_H(A \wedge B) \approx P_H(B)$), whether they should commit corresponding conjunction fallacies. In any case they should commit some conjunction fallacies by chance. This pattern would be broadly analogous with many previous findings concerning traditional conjunction fallacies. In regard to double conjunction fallacies, it is important that it is not sufficient that $x_a$ is the mode of the observed frequencies. In Example 6 (FIG. 3) $x_a$ is most frequent, but Bayesian logic does not predict double conjunction fallacies.

Hence, Bayesian logic predicts double conjunction fallacies and single conjunction fallacies based on explicit frequency information and specifies the quantitative preconditions for these effects.

Differential Sample Size Effects.

Being a Bayesian model (though not an extensional standard Bayesian model of logical probability judgments), Bayesian logic integrates the reliability of a sample and the probability of a logical hypothesis into one single measure. More interestingly, Bayesian logic specifically predicts that the set size effects differ for the different connectors.

Examples 3 and 4 (FIG. 3) are concerned with the same extensional probabilities as Examples 1 and 2, but they have very low sample sizes. Bayesian logic predicts strong sample size effects particularly for very small sample sizes. More interestingly, Bayesian logic predicts differential sample size effects. The left and right graphs show that the difference between the pattern probabilities of the hypotheses is reduced in the very small sample size versions of the 'AND' pattern (Example 3), but not as much in the 'A' pattern (Example 4). Please note that they both differ only by a single case, and the extensional probabilities are identical to the large set size conditions (Example 1 and 2). According to extensional probability, there should either be no sample size effect or no differential sample size effects (cf. Experiment 1 and 2). This differential sample size effect generalizes to other logical connectors (not treated in the examples of FIG. 3). For instance, given flat priors the frequency tuple <4,2,2,1> should lead to $P_H(A \vee B) > P_H(A \wedge B)$, whereas <40,20,20,10> should lead to $P_H(A \wedge B) > P_H(A \vee B)$.

Pattern Sensitivity.

Bayesian logic predicts internal and external pattern sensitivity. For example, think of three frequency patterns, representing samples of female graduates of three single-sex schools (Table 4, Example 5 to 7). Imagine one is testing hypotheses whether graduates from each of the schools rather become bank tellers, feminists, or both.

TABLE 4

Observed Frequencies for Different Schools

| Schools | A∧B | A∧¬B | ¬A∧B | ¬A∧¬B | Sum |
|---|---|---|---|---|---|
| Example 5, Linda, AND | 18 | 5 | 6 | 7 | 36 |
| Example 6, Maria, A | 18 | 15 | 1 | 2 | 36 |
| Example 7 Johanna, B | 13 | 5 | 11 | 7 | 36 |

Bayesian logic predicts changing estimates for $P_H(X)$, even if corresponding extensional probabilities remain identical (cf. FIG. 2, Examples 5 to 7).

External pattern-sensitivity is illustrated by comparing Examples 5 and 6. Here $P_E(A \land B)$, the overall set sizes, and, hence, even $f(A \land B)$ are held constant (going beyond Examples 1 and 2). Here only the distribution—not the number or portion—of disconfirmatory cases outside of set 'A ∧ B' is varied. Nonetheless, Bayesian logic predicts that $P_H(A \land B)$ and the number of double conjunction fallacies should be higher in Example 5 than in Example 6. Moreover, Bayesian logic predicts internal pattern effects if one, for instance, compares Examples 5 and 7, concerned with the distribution of cases within the set 'B'. Again the number of confirmative and disconfirmative cases is kept constant, now only varying the distribution within the set in question. Although the extensional probability $P_E(B)$ is identical in both examples, $P_H(B)$ should be higher in Example 7 than in Example 5 (FIG. 4).

Single-case and Trial-by-trial Learning.

The system and method of Bayesian logic makes predictions for single-case and trial-by-trial learning of logical relations. Bayesian logic uses occurrences in contingency tables as input. In regard to our questions relating two events in some logical way, single-case observations can simply be interpreted as a specific 2×2 contingency table with a set size of one. Example 8 is concerned with a single 'A&B' observation (input quadruple '1, 0, 0, 0'), Example 9 with a single 'A& ¬B' observation (input quadruple '0, 1, 0, 0'). FIG. 2 provides the outputs of the model. In Example 8 the AND hypothesis is more probable than the A and B, respectively. In Example 9, the A hypothesis dominates both the AND hypothesis and the B hypothesis. For the modeling we again assumed uniform priors, but for single-case observations the model is less robust against deviations from this assumption. Nonetheless, trial-by-trial observational learning of logical pattern probabilities can be modeled parsimoniously by using the posterior probabilities as a new prior probability distribution for each new trial.

Prior Probabilities of Hypotheses.

Although Bayesian logic differs from traditional extensional Bayesian account of conjunction fallacies, it also postulates an impact of prior probabilities of the logical hypotheses. Bayesian logic may predict effects of priors, at least in very low sample size conditions. This prediction is linked to the debate on base-rate neglect. One may think that Bayesian logic should fall prey to this problem anyway, but, firstly, there are concerns with frequency data from a natural sampling process, and, hence, base-rate neglect should largely disappear. Secondly, some authors have showed that base-rate neglect is due to other factors, like unclear nested-set relations in particular. Since in the present method a contingency table design is used, base-rate neglect should have a minimal impact. Perhaps the robustness of the pattern probabilities for small, medium or large sizes (Study 4, but cf. Study 1 and 2) may potentially provide an explanation for at least a specific kind of base-rate neglect.

Priors Probabilities of Noise Levels.

There should be conditions under which the prior probabilities of the noise levels (as far as they are understood in the sense assumed here) affect the posterior probability of different logical hypotheses. In previous examples there was no clear reversal of pattern probability over different noise levels. However, in Example 10 of FIG. 3 (with the data pattern '9, 3, 1, 0') the relative magnitude of the posterior probabilities of the hypotheses can be reversed by using different global prior probabilities for the noise levels. A noise level R=0 does not allow for any of the two hypotheses, but for an inclusive OR hypothesis (not listed here). Assuming only a slightly increased noise level, should make the A hypothesis most probable, for a higher noise level the AND hypothesis becomes dominant.

Hypothesis Space.

The subjective hypothesis space (formalized as a prior $P(A \circ B) < x$, with x close to 0) will normally be linked to the given or discussed hypotheses. Provided the data of Example 7 (FIG. 3), the hypothesis 'A ∧ B' may be presented either together with the 'B' hypothesis (which is more probable), or together with (the less probable) 'A' hypothesis. In the former case, the estimated $P_H(A \land B)$ should be lower than in the latter case. Pattern probabilities depend on the mentally represented alternative hypotheses (the priors).

Systematic Logical Inclusion Fallacies.

Inductive Bayesian logic provides a general account not limited to the conjunction fallacy, but applicable to all 16 binary logical connectors. All discussed phenomena should also apply more generally. The occurrence of a 'disjunction fallacy' in classical Linda tasks corresponds to the predictions of Bayesian logic. If 'A' was 'typical', the probability of 'A' was found to be judged more probable than that of the inclusive disjunction 'A or B (or both)'. However, this is false according to extensional probability. Bayesian logic goes beyond these results, and predicts many kinds of novel logical inclusion 'fallacies'. For example, extensionally it is always the case that $P_E(A \land \text{not-B}) \leq P_E(\text{either A or B}) \leq P_E(A \text{ or B or both})$. In contrast, the postulated Bayesian logic may predict $P_H(A \land \text{not-B}) > P_H(\text{either A or B}) > P_E(A \text{ or B or both})$. In a number of studies several predictions including logical inclusion fallacies have been supported, as predicted by Bayesian logic. The technical model of Bayesian logic also as a model of human behavior ontainde a higher model fit than previous models of the conjunction fallacy. Hence, it may also be useful to predict a class of human probability judgments traditionally thought to be irrational.

In sum, Bayesian logic makes not only qualitative predictions, but also a number of quantitative predictions, of which three are to be tested in the studies reported here.

Related Computational Models

Inductive Bayesian logic is a novel model of a pattern-sensitive testing of logical hypotheses. It is based on logical probability tables and on noise levels, whose probability is also estimated from the data. In situations in which a participant is concerned with the probabilities of hypotheses about whole situations (not about particular subsets only), Bayesian logic is applicable. It is applicable to provide logical evaluations of a situation in a single sentence, whereas extensional subset probability would require the determination of several subsets to characterize a situation. In this section Bayesian pattern-sensitive logic is delineated from other models. Firstly, Bayesian logic is discussed in the larger context of philosophy, probability theory, statistics, machine learning and AI. Secondly, models are considered within in the conjunction fallacy debate, and, thirdly, similar models in other fields of psychology.

Non-Standard Probability Theory, Statistics and AI

As outlined, non-standard theories of probability or belief, like the Dempster-Shafer theory of belief functions or Cohen's Baconian probabilities, do abandon Kolmogorov's axiom of additivity, but they, like fuzzy logic too, do not abandon the conjunction rule. Hence, these approaches neither explain or predict conjunction fallacies nor give a rational account of this phenomenon.

In this respect, pattern-sensitive Bayesian logic also goes beyond traditional approaches of inductive logic. For instance, Reichenbach (1935) used the product of the probability of independent events, $P(B) \times P(F)$, in order to calculate $P(B \wedge F)$ which can never be larger than $P(B)$ or $P(F)$ alone. Hence, this early formalization did not abandon the conjunction rule $P(B) \geqq P(B \wedge F)$. Hempel (1945), as a second example, tried to defend some basic notion of confirmation and emphasized that all observed cases corresponding to true cases of a truth table confirm the connector in question. In contrast with Bayesian logic, Hempel did not specify an ideal distribution of observations over several true cases of a connector, and did not work with distributions of noise levels. In summary, classical inductive logic was normally linked to standard extensional probability theory. It was not sensitive to distributions within a set of confirmatory cases, and it did not integrate over several hypothetical noise levels.

Generally speaking, Bayesian logic is a Bayesian account that combines some standard tools from Bayesian statistics in a particular way with a set of assumptions, resulting in a completely novel estimate of the holistic probability of a connector. Standard Bayesian statistics or Bayesian theory of science is normally not directly concerned with modeling different logical connectors. However, if concerned with logical connectors, Bayesian approaches mostly inherited the extensional interpretation from extensional probability theory, extensional logics or extensional Zermelo-Fraenkel set theory. Hence, without additional assumptions like those made by Bayesian logic, a direct application of Bayesian statistics to logical connectors is neither pattern-sensitive nor does it account for rational violation of the conjunction rule. In this respect, it has generally and correctly been recognized that 'Conjunction Fallacies' cannot be resolved by standard Bayesian theory.

Proposals on a Bayesian resolution of the raven's paradox may have minor similarities but they differ in several aspects from the current approach. Firstly, these approaches use other constraints, not the assumption of idealization, secondly, they have been concerned with single observations not with patterns of observations, thirdly, they were not formulated with respect to the inclusion rule comparing different logical connectors, and, finally, they do not integrate over different noise levels, whose probability is itself calculated from the data.

Only the term 'Bayesian Logic' has previously been used, either referring to some general Bayesian approach or referring to a specific model, not directly related to the current one. In contrast, Bayesian logic, as developed here, is a pattern-sensitive and noise-level-based inductive logic providing a rational explanation of inclusion fallacies. In a context, where a confusion of terms is implausible, it seems suitable to dub the present model '(inductive and pattern-sensitive) Bayesian logic'.

Recent research on AI and machine learning dealt with proposals combining the first order predicate calculus with the probability calculus and relational data bases. Likewise, Markov logic networks or Bayesian logicOG/NP-Bayesian logicOG language are approaches in the intersection of logic and probability theory. However, these approaches also do not constitute a pattern-sensitive inductive Bayesian logic integrating over different noise levels.

Mathematical Models of the Conjunction Fallacy in the Psychological Debate

Although most psychological theories of the conjunction fallacy were not formalized in a mathematical way, there are a few mathematically-specified proposals which previously tried to overcome the 'vagueness of representativeness heuristic'. These mathematical proposals have postulated at least semi-rational processes that may explain psychological conjunction fallacies. Although some of these models may have their share explaining some kinds of conjunction fallacies, they all differ technically from Bayesian logic and cannot account for all predictions of Bayesian logic In conclusion, the outlined mathematical and technical accounts and the account in the cognitive sciences of the conjunction fallacy all substantially differ from Bayesian logic, both in their predictions and technically, for instance, not integrating over different noise levels.

The invention claimed is:

1. A system for the inductive determination of pattern probabilities of all 16 dyadic logical connectors comprising:
a processor controlled machine configured to implement:
at least one input unit for frequency data, prior probabilities of connectors and noise levels, and model parameters;
a central representation unit for representing a field of specific ideal probability tables based on specific model assumptions;
a first determination unit for calculation the data probability given this field of probability tables via multinomial distributions for each table;
a second determination unit for a Bayesian update process for each probability table; and
an output unit for providing pattern-sensitive hypothesis probabilities for connectors at a particular noise level and aggregated probabilities for noise levels or connectors.

2. The system according to claim 1, wherein the central representation unit is provided for representing a field comprising logical connectors and related noise levels of specific ideal probability tables.

3. The system according to claim 1, wherein the first determination unit is provided to determine separately the likelihood of the frequency data entered in to the input unit for each connector together with one given noise levels.

4. The system according to claim 1, further comprising a weighting unit provided to weight the probabilities of the data given the noise-level-connector combinations in a way which monotonically decreases with the inverse of their noise value.

5. The system according to claim 4, wherein the weighting unit is provided to normalize the weighted noise level probabilities.

6. The system according to claim 1, wherein the second determination unit is provided to update the probability for noise levels and connector patterns separately for each combination of connector and noise level.

7. The system according to claim 1, wherein the output unit is provided to update the probability for noise levels and connector patterns by making use of the aggregated probabilities for each noise level and the probabilities for each connector, by recombining both.

8. The system according to claim 1, wherein the output unit is provided to determine separately the most probable connector pattern or a ranking of connector patterns for a given table of frequency data or the most probable noise level or a ranking of noise levels.

9. The system according to claim 1, wherein the system is configured for technically predicting human behavior.

10. The system according to claim 1, further comprising a data mining unit, a search engine unit or a human-machine interface.

11. A method for inductive determination of pattern probabilities of all 16 dyadic logical connectors comprising the steps of:
   a) inputting frequency data, prior probabilities of connectors and noise levels, and model parameters;
   b) representing a field of specific ideal probability tables based on specific model assumptions;
   c) simultaneously calculating the data probability given said ideal probability tables via multinomial distributions;
   d) updating of each of the probability tables by use of a Bayesian logic;
   e) outputting pattern-sensitive hypothesis probabilities for connectors at a particular noise level and aggregated probabilities for noise levels of connectors.

* * * * *